(No Model.) 3 Sheets—Sheet 1.
J. A. STONE.
CORN HARVESTING MACHINE.
No. 389,117. Patented Sept. 4, 1888.
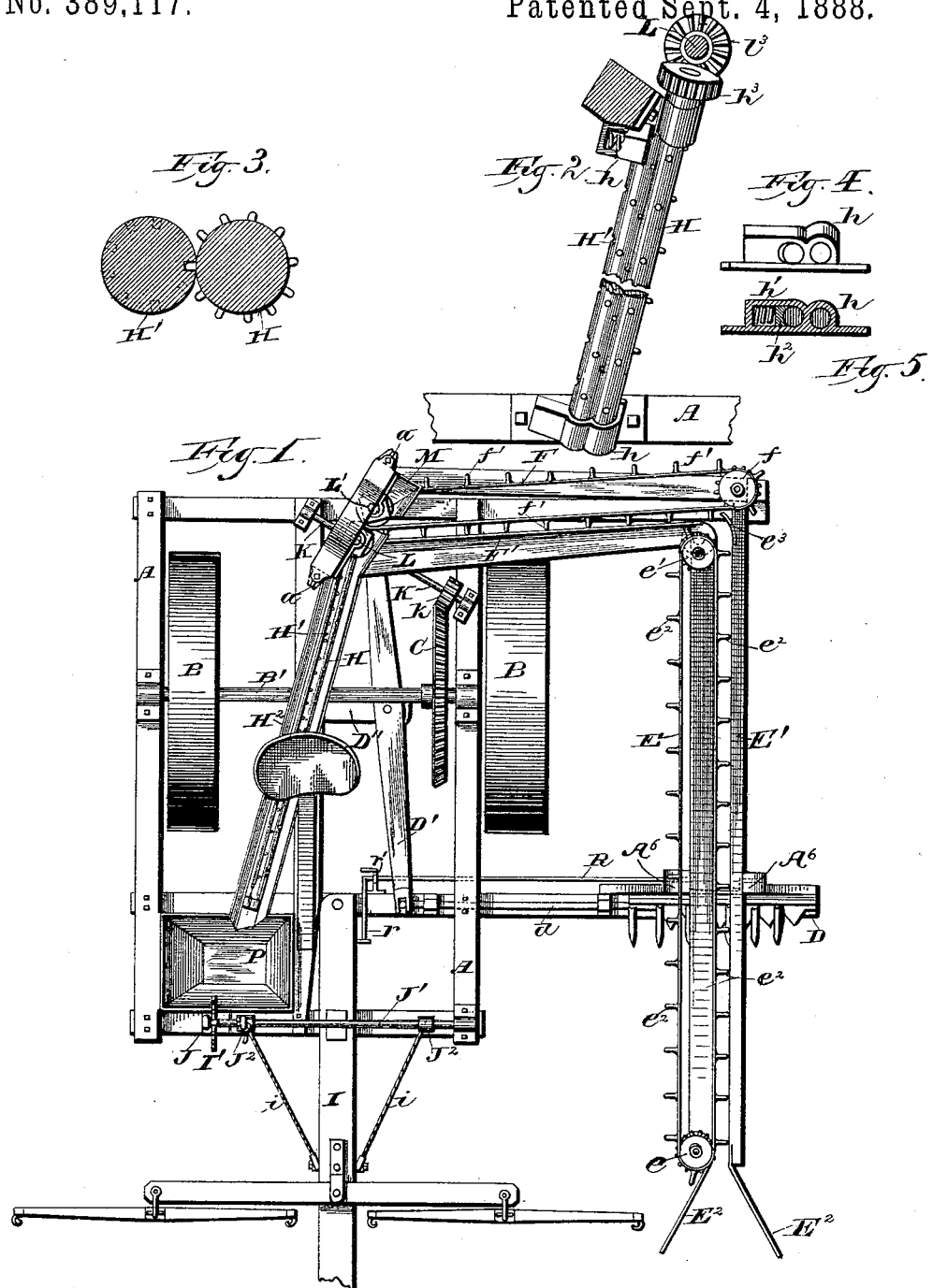
Witnesses:
E. G. Somus
Chas. D. Goss
Inventor:
John A. Stone,
By [signature]
Attorney.

(No Model.) 3 Sheets—Sheet 2.
J. A. STONE.
CORN HARVESTING MACHINE.
No. 389,117. Patented Sept. 4, 1888.
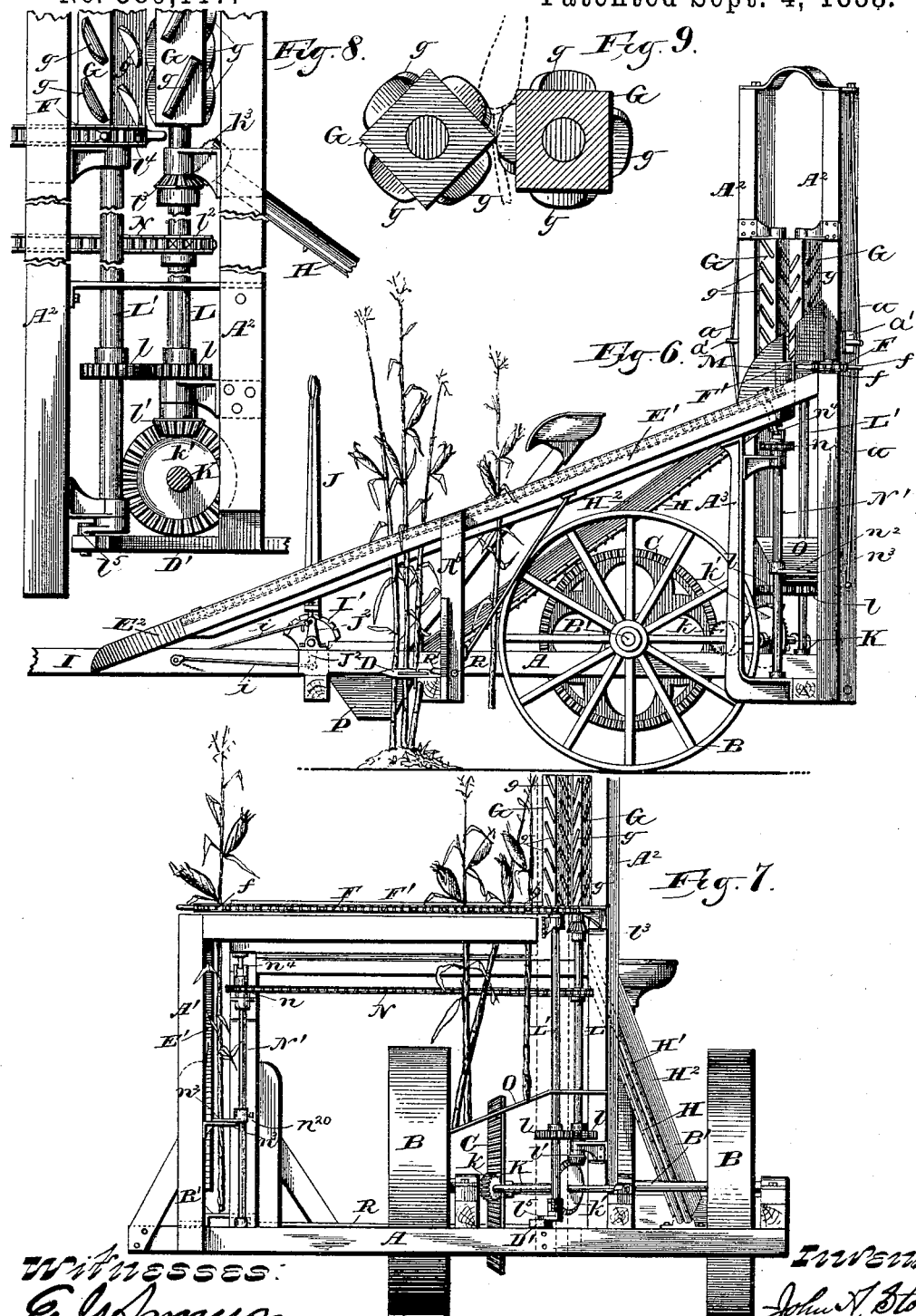

(No Model.) 3 Sheets—Sheet 3.

J. A. STONE.
CORN HARVESTING MACHINE.

No. 389,117. Patented Sept. 4, 1888.

Witnesses.
Arthur Johnson
Andrew Stark

Inventor.
John A. Stone.
By Chas. S. Burton,
his atty.

UNITED STATES PATENT OFFICE.

JOHN A. STONE, OF VAIL, IOWA.

CORN-HARVESTING MACHINE.

SPECIFICATION forming part of Letters Patent No. 389,117, dated September 4, 1888.

Application filed April 25, 1887. Serial No. 235,954. (No model.)

*To all whom it may concern:*

Be it known that I, JOHN A. STONE, of Vail, in the county of Crawford and State of Iowa, have invented certain new and useful Improvements in Corn-Harvesting Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main objects of my invention are, first, to cut corn; second, to separate the ears from the stalks, and, third, to husk and clean the ears; and in the attainment of these ends, first, to conduct the corn uniformly and in the proper position to the mechanism for snapping the ears from the stalks; second, to remove the larger and worthless portions of the stalks before they are operated upon by the mechanism for separating the ears therefrom, and, third, to economize power and prevent clogging of the machine.

The mechanism employed by me to accomplish the foregoing ends consists, essentially, of a cutter for severing the stalks, mechanism for separating the ears from the stalks, a conveying mechanism arranged to conduct the corn as it is cut in an upright position to said separating mechanism, a cleaning device for stripping the husks and silk from the ears after the same are severed from the stalks, and of certain other features hereinafter specifically described. The conveying mechanism comprises two conveyers, one extending from front to rear and the other at the rear end of the first and extending transversely thereto. The latter receives the stalks from the former, and the two operate as a continuous conveying device, as more fully hereinafter pointed out.

In the accompanying drawings, like letters designate the same parts in the several figures.

Figure 10:
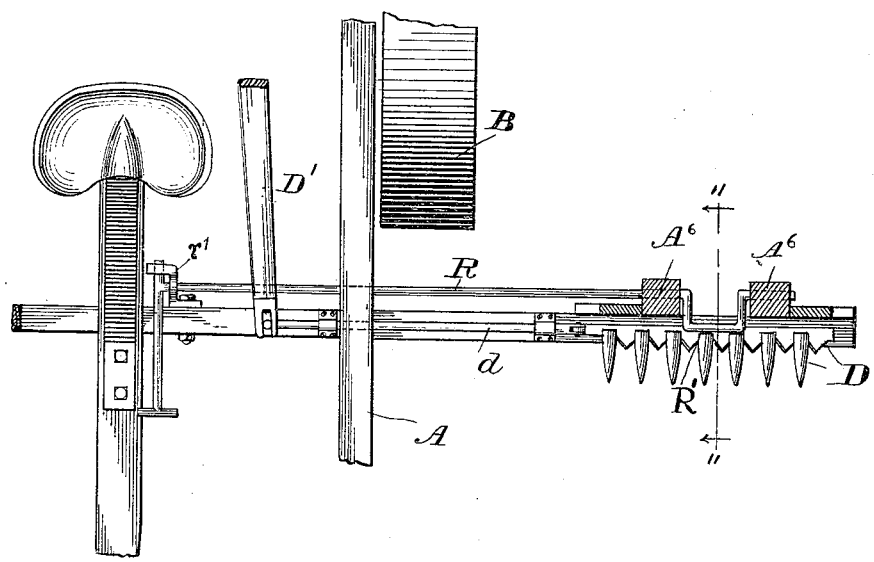
Figure 11:
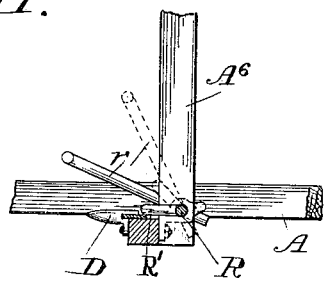

Figure 1 is a plan view of my machine. Fig. 2 is a like view, on an enlarged scale, of the ear-cleaning rollers detached. Fig. 3 is a cross-section, on a still larger scale, of said cleaning-rollers. Fig. 4 is an end elevation of one of the double boxes in which said rollers bear. Fig. 5 is a section of the same taken at right angles to said rollers. Fig. 6 is a side elevation of the machine in operation. Fig. 7 is a rear elevation of the same. Fig. 8 is a normal elevation of the snapping-rollers and their connections on an enlarged scale; and Fig. 9 is a cross-section, on a still larger scale, of said rollers. Fig. 10 is a partly-sectional detail plan of a device for retarding the base of the stalks just behind the cutter. Fig. 11 is a section through the line marked 11 11 on Fig. 10.

A A represent the bed frame-work of the machine; B B, the driving-wheels, and B' the driving-shaft, upon which said wheels are mounted, with ratchets (not shown) similar to those employed in mowing-machines, whereby either or both of said wheels may be reversed or turned back without effect upon said shaft.

K is a counter-shaft supported in bearings on the frame A, behind shaft B' and oblique thereto. It is provided with a small bevel-gear, $k$, which works with a larger bevel gear, C, fixed on said driving-shaft B'.

Referring to Figs. 6, 7, and 8, L L' are two upright shafts supported in bracket-bearings secured to the upright frame pieces or posts $A^2 A^2$, which latter are set one on each side of the shaft K in a plane at right angles thereto, as seen in Fig. 1. Upon the upper ends of the shafts L L' are mounted the snapping-rollers G G, which are preferably cast square, as shown, or of any other suitable polygonal or prismatic form, with inclined ears or wings $g$ $g$ on their lateral faces, preferably set in spiral lines about said rollers, the wings or ears on one roller alternating with those on the other.

The shaft L is provided at the lower end with a small bevel-gear, $l'$, which works with a larger bevel-gear, $k'$, on the shaft K, with a gear, $l$, working with a like gear, $l$, on the shaft L'. It is also provided with a sprocket-wheel, $l^2$, and near the upper end, just below its snapping-rollers G, with a small bevel-gear, $l^3$. The shaft L' is provided just below its snapping roller G with a sprocket-wheel, $l^4$, which may be cast integrally with said roller, and at its lower end with a crank, $l^5$. The uprights $A^2 A^2$ are braced laterally, and the snapping-rollers G G prevented from spreading by the truss-rods $a$ $a$, secured at their ends to the outer sides of said uprights, respectively, and strained over the horizontal struts $a'$ $a'$, interposed between said uprights and truss-rods, respectively, about midway in the length of the latter.

D represents the finger-bar, in which the cutter is arranged to work in the usual manner.

D' is a lever fulcrumed at an intermediate point to a bracket, D'', secured to the frame A, said lever being connected at one end with the crank $l^5$ on the lower end of the shaft L', and at the opposite end by the rod $d$ with the cutter.

E is an endless-chain conveyer provided at suitable intervals with projections $e^2$ $e^2$ and mounted upon sprocket-wheels $e$ $e'$, over the cutter-bar and at right angles thereto. It is set with its front end in advance of and approximately on the same level with the cutter-bar D, and from its front end gradually ascends toward the rear of the machine, where it meets the outer end of a transverse chain conveyer, F, provided in like manner on its outer side with fingers or projections $f'$ $f'$ and mounted upon the sprocket-wheels $f$ and $l^4$, the former journaled at the upper end of the upright post A', which is supported by the bed frame-work A at the rear grainward corner of the machine.

E' is a guide-board placed outside of and parallel with the conveyer-chain E at a sufficient distance to be cleared by the fingers or projections $e^2$ $e^2$, and to form with said conveyer-chain a passage for the corn. On each side of such passage, at its front end, are secured the forwardly-diverging gathering-arms $E^2$ $E^2$, which are properly located to engage a single row of corn, and guide the stalks into the passage to be in position to be caught by the fingers $e^2$ $e^2$ on the conveyer-chain E.

N' is an upright shaft bearing in brackets formed upon or secured to a standard, $A^3$, which supports the rear end of the conveyer E. It is connected at the upper end by a universal joint, $n^4$, with the inclined shaft of the sprocket-wheel $e'$, carrying the upper rear end of the chain belt E, and is also provided with a sprocket-wheel, $n$, which is connected by a chain belt, N, with the sprocket-wheel $l^2$ on the shaft L, from which the conveyer E is driven. Upon said shaft N' a knife, $n^2$, is secured at any desired position below the chain N by a set-screw, $n^{20}$, which binds it to said shaft, which works like a shear, with a like knife, $n^3$, secured in a position corresponding to that of the knife $n^2$ to an upright, A', to the frame of the machine. To the inner side of the guide-board E', at its upper rear end, is attached a curved guide, $e^3$, which is a piece of sheet metal bent concave toward the axis of the upper sprocket-wheel, $e'$, by which the corn is directed around said sprocket-wheel $e'$ into the passage between the chain F and guard F', which sustains the same relation to the chain F as the guard E' sustains to the chain E, being a board set edgewise in front of the chain F and extending from the vicinity of the wheel $e'$ to the vicinity of the wheel $l^4$.

H H' represent the cleaning-rollers, one of which is provided with projections or teeth which work with corresponding openings in the other. They are supported in boxes $h$ $h$, secured to the frame of the machine, and extend from the snapping-rollers downwardly toward a receptacle or hopper, P, provided at or near the front of the machine to receive the corn. The boxes $h$ $h$ are each recessed on one side to receive a yielding bearing, $h^2$, and spring $h'$, as seen in Fig. 5. The yielding boxes $h^2$ are the journal-bearings of the roller H', by means of which said roller H' is allowed to yield away from the roller H sufficiently to permit the passage of any hard obstruction.

$H^2$ is an upwardly laterally-flaring chute placed about said cleaning-rollers H H', and open longitudinally underneath the same. Said chute connects at its lower end with the hopper P, and is formed at the upper end, about the snapping-rollers G G, with an enlargement or hopper, M, which is transversely slotted to allow the cornstalks to pass from the belt F' through between the rollers G G.

O is an inclined floor secured to the frame of the machine underneath the snapping-rollers G G and the adjacent end of the conveyer F, and arranged to elevate the stalks as they approach said rollers, as shown most clearly in Fig. 7.

R is a rock-shaft located about on the level of the cutter and journaled in the bracket $r'$, near the vertical plane of the driver's seat, and also in the standards $A^6$, which support the frame of the conveyer E and its guide E'. It has a cranked part, R', which extends behind the cutter, and it has also a crank-arm, $r$, near the bracket $r'$, which extends up within reach of the driver's foot, so that he can by means of it rock the shaft R and throw the cranked portion R' up or down to make it trip the butts of the cornstalks as they pass from the cutter, or allow them to pass without being tripped, as desirable. The operation of this device is hereinafter further explained.

I is the pole pivoted at the rear end to the frame A, upon which it is capable of a slight lateral oscillation, in order to change the draft of the machine and cause the same to run more to one or the other side, as desired.

J' is a rock-shaft journaled in suitable bearings at the front end of the machine transversely to and over the pole I, and provided on one side thereof with an upwardly-projecting and on the other side with a downwardly-projecting arm, $J^2$, each connected by a rod or cable, $i$, with the adjacent side of the pole, as seen in Figs. 1 and 6. Upon said shaft J' is fixed a lever, J, within convenient reach of the operator, and provided with a spring-catch arranged to work with a notched arc or segment, I'.

My machine operates as follows: The corn is caught between the gathering-arms $E^2$ $E^2$ and guided by them into the conveyer, the stalks being separated and conducted by the fingers on chain E to the cutter, which severs them from the ground, as seen in Fig. 1. The corn, which as it enters between the conveyer-chain E and the guide E' is engaged by the chain below the ears, is held up by means of the ears engaging thus above said chain while it is carried from the cutter to the rear of the machine and delivered to the conveyer F, which conducts it in like manner, separated and in an upright position, to the snapping-rollers G G, which, grasping the stalks, draw them between them, and the wings or flanges $g$ $g$, engaging the butts of the ears first on one side and then on the other, twist them from side to side against the face of the opposite roller presented obliquely thereto, as seen in Fig. 9, and sever the stalks close to said ears. As the stalks pass the knives $n^2$ $n^3$, the large worthless butts are cut off, and the heavier portion of the stalks below the ears is thus prevented from passing between and retarding and obstructing the snapping-rollers G G. As the corn approaches said snapping-rollers, the stalks pass upon the inclined guide O and are pushed up endwise, so as to bring the ears into the proper position to be effectively operated upon by them. Whenever stalks are encountered inclining in the direction of the advance of the machine, the operator raises the crank-arm $r$, and thereby the guard R, which engages the butts of the stalks as they leave the cutter and hold them until the chain E carries them into an upright position uniform with the others, when they will slip over and clear said crank or guard R'. As the ears are severed from the stalks by the snapping-rollers, they drop into the hopper M and are caught by the cleaning-rollers H H', by which the husks, silk, &c., are stripped therefrom and deposited upon the ground below, while the ears of corn retained upon said rollers by the chute $H^2$ are deposited in the hopper or receptacle P. The yielding bearing $h^2$ of the roller H' permits any hard substance to pass between it and the other roller, H, without injury or obstruction thereto. The operator moves the pole I slightly to his right or left to cause the machine to run closer to or farther from the row of corn to be cut, as desired, and at the same time to bring the horses between the hills or rows.

Various changes in the construction and the arrangement of the details of my machine may be made without departure from the spirit of my invention.

I claim—

1. In a corn-harvesting machine, the combination of a cutter, a pair of upright polygonal snapping-rollers having inclined wings on their lateral faces, those of one roller alternating with those of the other, and a conveyer arranged to conduct the corn thereto, substantially as and for the purposes set forth.

2. In a corn-harvesting machine, the combination, with the cutter, of the snapping-rollers, a conveyer arranged to carry the corn from the cutter to said rollers, and a cutter located in the path of the corn from the cutter to the snapping-rollers, arranged to trim off the butts of the stalks before they pass between said rollers, substantially as and for the purposes set forth.

3. In a corn-harvesting machine, in combination with the cutter to sever the standing stalks, a device for separating the ears from the stalks, a conveying mechanism to conduct the stalks from the cutter to the ear-separating device, and an additional device comprising cleaning-rollers, which receive the ears from the ear-separating device without intermediate conveying mechanism, said cleaning-rollers revolving toward each other to strip the husks and silk from the ears, substantially as set forth.

4. In a corn-harvesting machine, the combination, with the cutter, of a conveyer arranged to receive the corn and hold the same in an upright position while being cut, and after the same is cut to carry it to the rear, and a guard placed back of the cutter and arranged to engage the butts of forwardly-inclined stalks and bring the same to an upright position, substantially as and for the purposes set forth.

5. In a corn-harvesting machine, the combination, with the cutter, of a conveyer to take the corn therefrom, placed above and transversely thereto and inclined upward from front to rear, a second conveyer set transversely thereto and arranged to receive the corn therefrom and deliver the same in an upright position to the snapping-rollers, and the snapping-rollers, substantially as and for the purposes set forth.

6. In a corn-harvesting machine, in combination with the cutter, the upright snapping-rollers, and the conveyer arranged to carry the cornstalks from said rollers in an upright position, and an inclined guideway, O, located below the conveyer and sloping upward in the path of the stalks toward the snapping-rollers to cause the stalks to be pushed up endwise as they approach the said rollers, substantially as and for the purpose set forth.

7. In a corn-harvesting machine, in combination with the cutter which severs the standing stalks, snapping-rollers to detach the ears from the stalks, and conveying mechanism which conducts the stalks, after they are severed by the cutter, to the snapping-rollers, and a hopper to receive the ears from the snapping-rollers, and inclined cleaning-rollers which receive the ears from the hopper to strip the husks and silk therefrom, substantially as set forth.

8. In a corn-harvesting machine, in combination with the cutter to sever the standing stalks, upright snapping-rollers to separate the ears from the stalks, conveying mechanism which conducts the stalks from the cutter to the snapping-rollers, and a chute arranged transversely to the conveying mechanism, which commences in a hopper located below the snapping-rollers and arranged to receive the ears as they drop from said rollers, said hopper being formed with a slot to permit the passage of the stalks through it while they pass between the snapping-rollers, substantially as set forth.

9. In a corn-harvester, in combination with a cutter to sever the standing stalks, a conveying and elevating mechanism comprising a conveyer inclined upward from front to rear, and upright snapping-rollers located at the delivery end of said conveying mechanism, said snapping-rollers being elevated above the level of the cutter a distance corresponding to the elevation of the delivery end of said conveying mechanism above the cutter, whereby the ears detached from said stalks by said snapping-rollers have room to descend after being detached, substantially as set forth.

10. In a corn-harvester, in combination with the cutter, a conveying and elevating mechanism comprising the conveyer sloping upward from front to rear across the vertical plane of the cutter, whereby the stalks are simultaneously carried rearward from the cutter and elevated, elevated snapping-rollers located at the elevated or delivery end of said conveying mechanism, whereby the ears are detached from the stalks at an elevation, a hopper located at the lower end of said snapping-rollers to receive the ears therefrom, and a pair of inclined rollers whose upper end is in position to receive the ears from said hopper, said rollers revolving toward each other on the upper side to clean the husk and silk from the ears while they descend along the length of the rollers, substantially as set forth.

In testimony that I claim the foregoing as my own I affix my signature in presence of two witnesses.

JOHN A. STONE.

Witnesses:
   CHAS. L. GOSS,
   GEORGE M. GOLL.